(12) United States Patent
Maki et al.

(10) Patent No.: US 8,827,688 B2
(45) Date of Patent: Sep. 9, 2014

(54) SEALING SYSTEM FOR MOLDING MACHINE

(71) Applicant: Amcor Limited, Hawthorn (AU)

(72) Inventors: Kirk Edward Maki, Tecumseh, MI (US); George David Lisch, Jackson, MI (US); Bradley Wilson, Manchester, MI (US)

(73) Assignee: Amcor Limited, Hawthorn (AU)

( * ) Notice: Subject to any disclaimer, the term of this patent is extended or adjusted under 35 U.S.C. 154(b) by 1 day.

(21) Appl. No.: 13/721,291

(22) Filed: Dec. 20, 2012

(65) Prior Publication Data

US 2013/0164404 A1  Jun. 27, 2013

Related U.S. Application Data

(60) Provisional application No. 61/578,564, filed on Dec. 21, 2011.

(51) Int. Cl.
| | | |
|---|---|---|
| *B29C 49/12* | (2006.01) | |
| *B29D 22/00* | (2006.01) | |
| *B29C 49/18* | (2006.01) | |
| *B29C 49/58* | (2006.01) | |
| *B29C 49/62* | (2006.01) | |
| *B29C 49/42* | (2006.01) | |
| *B29C 49/46* | (2006.01) | |
| *B65B 3/02* | (2006.01) | |

(52) U.S. Cl.
CPC ........... *B29D 22/003* (2013.01); *B29C 49/4289* (2013.01); *B29C 49/12* (2013.01); *B29C 2049/4664* (2013.01); *B29C 49/18* (2013.01); *B29C 2049/4655* (2013.01); *B29C 2049/465* (2013.01); *B29C 49/46* (2013.01); *B29C 49/58* (2013.01); *B29C 49/62* (2013.01); *B65B 3/022* (2013.01)
USPC ........... 425/530; 425/524; 425/529; 425/535; 425/538

(58) Field of Classification Search
CPC ................. B29D 22/003; B65B 3/022; B29C 2049/4664; B29C 2049/4655; B29C 2049/465; B29C 49/12; B29C 49/18; B29C 49/46; B29C 49/58; B29C 49/62; B29C 49/4289
USPC .......................... 425/524, 529, 530, 535, 538
See application file for complete search history.

(56) References Cited

U.S. PATENT DOCUMENTS

| | | |
|---|---|---|
| 3,267,185 A | 8/1966 | Freeman, Jr. |
| 3,268,635 A | 8/1966 | Kraus et al. |

(Continued)

FOREIGN PATENT DOCUMENTS

| | | |
|---|---|---|
| EP | 0379264 | 7/1990 |
| EP | 0445465 | 11/1990 |

(Continued)

OTHER PUBLICATIONS

International Search Report and Written Opinion dated Apr. 29, 2013 in corresponding International Patent Application No. PCT/US2012/070922 (eight pages).

*Primary Examiner* — Joseph S Del Sole
*Assistant Examiner* — Lawrence D Hohenbrink, Jr.
(74) *Attorney, Agent, or Firm* — Harness, Dickey & Pierce, P.L.C.

(57) ABSTRACT

A system for forming a container from a preform, wherein the preform has a finish and a support ring. The system includes a mold having a mold cavity defining an internal surface and adapted to accept the preform, a pressure system having an inlet and an outlet outputting fluid, a blow nozzle receiving the fluid from the pressure system and introducing the fluid at a pressure into the preform thereby expanding the preform toward the internal surface of the mold cavity and creating a resultant container. The system further includes a first seal engagement selectively engageable between the blow nozzle and the finish of the preform and a second seal engagement selectively engageable between the blow nozzle and an adjacent feature.

31 Claims, 5 Drawing Sheets

(56) References Cited

U.S. PATENT DOCUMENTS

| | | | |
|---|---|---|---|
| 3,993,427 | A | 11/1976 | Kauffman et al. |
| 4,039,641 | A | 8/1977 | Collins |
| 4,177,239 | A | 12/1979 | Gittner et al. |
| 4,321,938 | A | 3/1982 | Siller |
| 4,432,720 | A | 2/1984 | Wiatt et al. |
| 4,457,688 | A | 7/1984 | Calvert et al. |
| 4,490,327 | A | 12/1984 | Calvert et al. |
| 4,499,045 | A | 2/1985 | Obsomer |
| 4,539,172 | A | 9/1985 | Winchell et al. |
| 4,725,464 | A | 2/1988 | Collette |
| 4,883,631 | A | 11/1989 | Ajmera |
| 4,935,190 | A | 6/1990 | Tennerstedt |
| 4,952,134 | A | 8/1990 | Bartley et al. |
| 5,129,815 | A | 7/1992 | Miyazawa et al. |
| 5,269,672 | A | 12/1993 | DiGangi, Jr. |
| 5,344,596 | A | 9/1994 | Hendry |
| 5,389,332 | A | 2/1995 | Amari et al. |
| 5,403,538 | A | 4/1995 | Maeda |
| 5,486,103 | A | 1/1996 | Meiring et al. |
| 5,540,879 | A | 7/1996 | Orimoto et al. |
| 5,599,496 | A | 2/1997 | Krishnakumar et al. |
| 5,622,735 | A | 4/1997 | Krishnakumar et al. |
| 5,635,226 | A | 6/1997 | Koda et al. |
| 5,687,550 | A | 11/1997 | Hansen et al. |
| 5,824,237 | A | 10/1998 | Stumpf et al. |
| 5,962,039 | A | 10/1999 | Katou et al. |
| 6,214,282 | B1 | 4/2001 | Katou et al. |
| 6,277,321 | B1 | 8/2001 | Vailliencourt et al. |
| 6,485,670 | B1 | 11/2002 | Boyd et al. |
| 6,502,369 | B1 | 1/2003 | Andison et al. |
| 6,692,684 | B1 | 2/2004 | Nantin et al. |
| 6,729,868 | B1 | 5/2004 | Vogel et al. |
| 6,749,415 | B2 | 6/2004 | Boyd et al. |
| 6,767,197 | B2 | 7/2004 | Boyd et al. |
| 7,141,190 | B2 | 11/2006 | Hekal |
| 7,165,956 | B2 * | 1/2007 | Santais et al. .................... 425/3 |
| 7,473,388 | B2 | 1/2009 | Desanaux et al. |
| 7,553,441 | B2 | 6/2009 | Shi |
| 7,563,092 | B2 * | 7/2009 | Mie .............................. 425/535 |
| 7,658,882 | B2 | 2/2010 | Minganti |
| 7,862,327 | B2 | 1/2011 | Rousseau et al. |
| 7,914,726 | B2 | 3/2011 | Andison et al. |
| 7,981,356 | B2 | 7/2011 | Warner et al. |
| 8,017,064 | B2 | 9/2011 | Andison et al. |
| 8,096,483 | B2 | 1/2012 | Riney |
| 8,435,026 | B2 | 5/2013 | Andison et al. |
| 2001/0010145 | A1 | 8/2001 | Tawa et al. |
| 2003/0168782 | A1 * | 9/2003 | Suzuki ......................... 264/532 |
| 2004/0070119 | A1 | 4/2004 | Fibbia et al. |
| 2005/0067002 | A1 | 3/2005 | Jones |
| 2005/0098527 | A1 | 5/2005 | Yates |
| 2005/0206045 | A1 | 9/2005 | Desanaux et al. |
| 2006/0097417 | A1 | 5/2006 | Emmer |
| 2006/0231646 | A1 | 10/2006 | Geary, Jr. |
| 2008/0029928 | A1 * | 2/2008 | Andison et al. ............... 264/238 |
| 2008/0069914 | A1 * | 3/2008 | Lemaistre ..................... 425/146 |
| 2008/0271812 | A1 | 11/2008 | Stefanello et al. |
| 2010/0037566 | A1 * | 2/2010 | Hansen .......................... 53/510 |
| 2010/0084493 | A1 | 4/2010 | Troudt |
| 2010/0143531 | A1 * | 6/2010 | Derrier et al. ................. 425/535 |
| 2010/0151073 | A1 * | 6/2010 | Daniel .......................... 425/522 |
| 2010/0213629 | A1 | 8/2010 | Adriansens |
| 2010/0303946 | A1 | 12/2010 | Voth |
| 2011/0265433 | A1 | 11/2011 | Chauvin et al. |

FOREIGN PATENT DOCUMENTS

| | | |
|---|---|---|
| EP | 0849514 | 6/1998 |
| EP | 1529620 | 5/2005 |
| EP | 1577258 | 9/2005 |
| EP | 1688234 | 8/2006 |
| FR | 2887525 | 12/2006 |
| JP | 57123027 | 7/1982 |
| JP | 63-249616 | 10/1988 |
| JP | 08-197563 | 8/1996 |
| JP | 09-011325 | 1/1997 |
| JP | 09057834 | 3/1997 |
| JP | 09099477 | 4/1997 |
| JP | 10-217258 | 8/1998 |
| JP | 2000-043129 | 2/2000 |
| JP | 2000-043130 | 2/2000 |
| JP | 2000-167915 | 6/2000 |
| JP | 2002-067131 | 3/2002 |
| JP | 2003-053823 | 2/2003 |
| JP | 2005-067002 | 3/2005 |
| JP | 2005-254704 | 9/2005 |
| JP | 2009-045876 | 3/2009 |
| JP | 2005-529002 | 9/2009 |
| KR | 10-0147442 | 8/1998 |
| KR | 2006-0105883 | 10/2006 |
| KR | 2006-0128062 | 12/2006 |
| WO | WO 02/24435 | 3/2002 |
| WO | WO 03/095179 | 11/2003 |
| WO | WO 2004/065105 | 8/2004 |
| WO | WO 2005/044540 | 5/2005 |
| WO | WO 2007/120807 | 10/2007 |
| WO | WO 2008/129013 | 10/2008 |

\* cited by examiner

SEALING SYSTEM FOR MOLDING MACHINE

CROSS-REFERENCE TO RELATED APPLICATIONS

This application claims the benefit of U.S. Provisional Application No. 61/578,564, filed on Dec. 21, 2011. The entire disclosure of the above application is incorporated herein by reference.

FIELD

This disclosure generally relates to an apparatus for filling containers with a commodity, such as a liquid commodity. More specifically, this disclosure relates to a sealing apparatus and method of using the same for forming and filling blown polyethylene terephthalate (PET) containers in a single process.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, there is a need for a liquid or hydraulic blow molding system suitable for forming and filling a container in a single operation. Moreover, there is a need for a modified preform that is particularly well-suited for molding system that form and fill a container in a single operation.

SUMMARY

This section provides a general summary of the disclosure, and is not a comprehensive disclosure of its full scope or all of its features.

Accordingly, the present disclosure teaches a system for forming a container from a preform, wherein the preform has a finish and a support ring. The system includes a mold having a mold cavity defining an internal surface and adapted to accept the preform, a pressure system having an inlet and an outlet outputting fluid, a blow nozzle receiving the fluid from the pressure system and introducing the fluid at a pressure into the preform thereby expanding the preform toward the internal surface of the mold cavity and creating a resultant container. The system further includes a first seal engagement selectively engageable between the blow nozzle and the finish of the preform and a second seal engagement selectively engageable between the blow nozzle and an adjacent feature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide for a blow mold device and nozzle system, and method of using the same, to permit the use of liquids as an injecting agent during the forming process. The present teachings further provide a method and apparatus for controlling and/or relieving the internal liquid pressures associated with the forming process. These liquids can be a disposable liquid or, in some embodiments, can comprise the liquid commodity. Therefore, in some embodiments, the liquids used for forming the container can remain therein for final packaging. The blow mold device and nozzle system provides controlled use of the liquid to minimize chances of contamination and prevent leakage during cycling. According to these principles, formation and filling of a container can be achieved in a single step without sacrificing clean and sanitary conditions.

As will be discussed in greater detail herein, the shape of the mold device and nozzle system of the present teachings and the container formed therewith can be formed according to any one of a number of variations. By way of non-limiting example, the molding apparatus of the present disclosure can be configured to hold any one of a plurality of containers and be used in connection with a number of fluids and commodities, such as beverages, food, or other hot-fill type materials.

It should be appreciated that the size and the exact shape of the mold device and nozzle system are dependent on the size of the container and the required operational parameters. Therefore, it should be recognized that variations can exist in the presently described designs. According to some embodiments, it should also be recognized that the mold can comprise various features for use with containers having vacuum absorbing features or regions, such as panels, ribs, slots, depressions, and the like.

The present teachings relate to the forming of one-piece plastic containers using a liquid. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads and a support ring. The threaded region provides a means for attachment of a similarly threaded closure or cap (not illustrated). Alternatives may include other suitable devices that engage the finish of the plastic container, such as a press-fit or snap-fit cap for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing.

The container can be formed according to the principles of the present teachings. As illustrated throughout the figures including FIGS. 1 and 8, a preform version 100 of the container includes a support ring 102, which may be used to carry or orient the preform through and at various stages of manufacture. For example, the preform may be carried by the support ring 102, the support ring 102 may be used to aid in positioning the preform in a mold cavity, or the support 102 ring may be used to carry an intermediate container once molded. As will also be discussed herein, support ring 102 may be also used to enhance a sealing interface between a mold nozzle system and the preform 100 during forming and filling. At the outset, the preform may be placed into the mold cavity such that the support ring is captured at an upper end of the mold cavity. In general, the mold cavity has an interior surface corresponding to a desired outer profile of the blown container. More specifically, the mold cavity according to the present teachings defines a body forming region and a base forming region.

In some embodiments, an internal stretch rod apparatus 20 (see FIGS. 1 and 2) stretches or extends the heated preform within the mold cavity thereby molecularly orienting the polyester material in an axial direction generally corresponding with the central longitudinal axis of the container. While the stretch rod extends the preform, a liquid assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in some, most, or all of the intermediate container. In some embodiments, the pressurized liquid holds the mostly biaxial molecularly oriented polyester material against the mold cavity for a period of time before removal of the container from the mold cavity.

Figure 1:
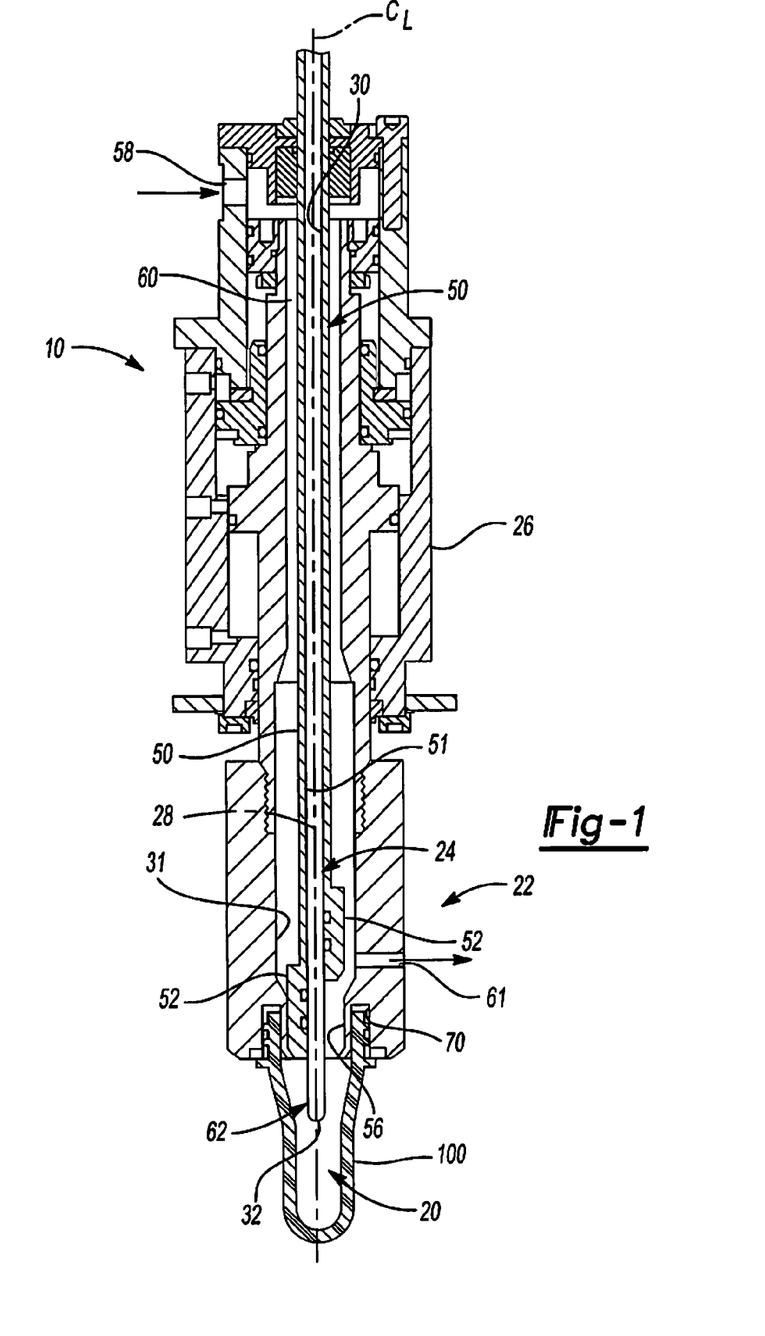
FIG. 1 is a partial, lower cross-sectional view illustrating an apparatus for forming a container using an optional stretch rod and pressurized liquid, wherein the portion left of the centerline illustrates an extended position and the portion right of the centerline illustrates a retracted position.
Figure 2:
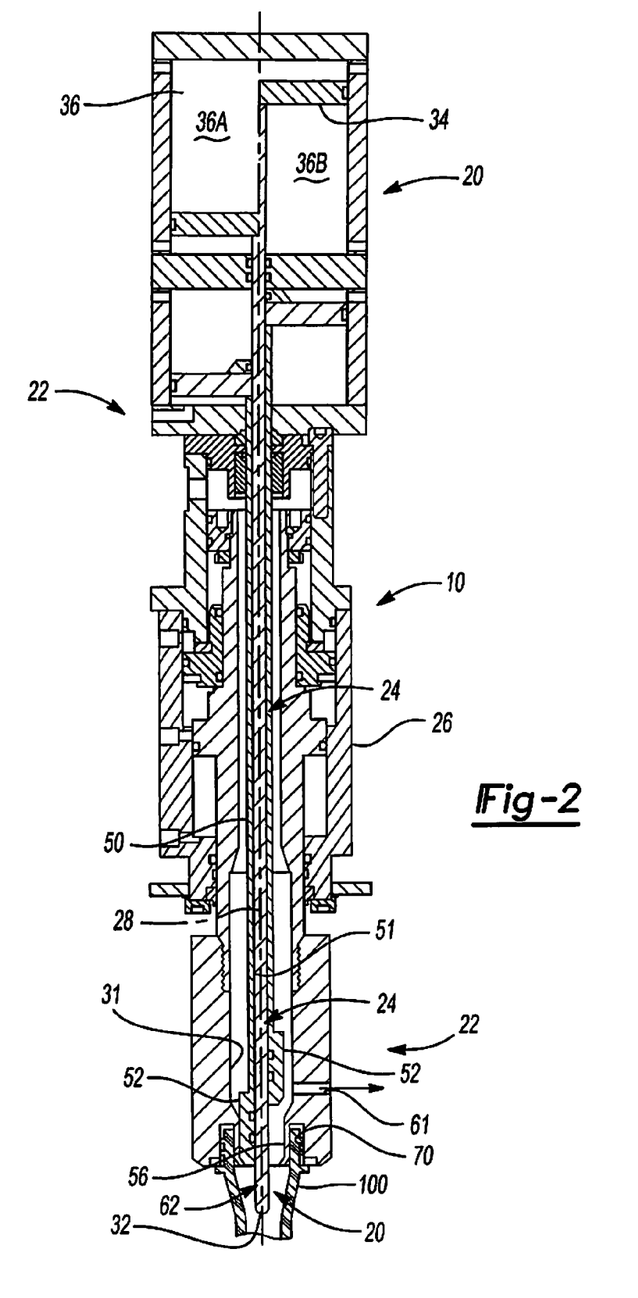
FIG. 2 is a partial, upper cross-sectional view illustrating the apparatus of FIG. 1 for forming a container using an optional stretch rod and pressurized liquid wherein the portion left of the centerline illustrates an extended position and the portion right of the centerline illustrates a retracted position.

With particular reference to FIGS. 1 and 2, a mold device and nozzle system 10 is provided comprising internal stretch rod apparatus 20 and a nozzle system 22 formed therewith that are each independently actuatable and yet, in some embodiments, actuatable simultaneously. Internal stretch rod apparatus 20 comprises a stretch rod member assembly 24 being slidably disposed within a housing 26. The internal stretch rod member assembly 24 and nozzle system 22 are illustrated in both an extended position and a retracted position (left of centerline CL in FIGS. 1 and 2 and right of centerline CL in FIGS. 1 and 2, respectively).

Stretch rod member assembly 24 can comprise a stretch rod 28 being slidably disposed (at least indirectly) within a central bore 30 of housing 26. Stretch rod 28 is generally cylindrical in shape having an engaging tip portion 32 at a distal end and a piston portion 34 at a proximal end. Tip portion 32 is shaped to engage preform 100 during manufacture, shaping, and/or filling. Piston portion 34 is received within a piston chamber 36 to closely conform therewith to define a piston assembly (for example pneumatic, hydraulic, servo, mechanical or the like). Piston portion 34 is responsive to changes in pneumatic, hydraulic, servo, mechanical or the like pressure within piston chambers 36A and 36B, thereby causing piston portion 34 to move in a direction generally aligned with centerline CL between an extended position (left side) and a retracted position (right side). Movement of piston portion 34 thereby causes associated movement of stretch rod 28 and tip portion 32.

Additionally, in some embodiments, nozzle system 22 comprises a seal rod 50 being slidably disposed within housing 26. That is, nozzle system 22 can comprise a seal rod 50 being slidably disposed within central bore 30 of housing 26. Seal rod 50 includes an engaging seal portion 52 at a distal end and a piston portion 66 at a proximal end. Seal portion 52 is shaped to engage a narrowed distal portion 56 of central bore 30. In this way, seal portion 52 can be position in a retracted position where seal portion 52 is spaced apart from an enlarged intermediate portion 31 of central bore 30 to permit the flow of liquid there past. Seal portion 52 can also be positioned in an extended and seated position where seal portion 52 sealingly engages narrowed distal portion 56. In the extended and seated position, seal portion 52 permits liquid to flow from a fluid inlet 58, through an annulus 60 of central bore 30 to enlarged intermediated portion 31 of central bore 30. However, in this position, flow out of nozzle system 22 is prohibited. In the retracted position, seal portion 52 is spaced apart from narrowed distal portion 56 and thus permits liquid to flow from fluid inlet 58, through annulus 60 of central bore 30 to enlarged intermediated portion 31 of central bore 30 and out fluid injector 62 and into preform 100. The fluid pressure within preform 100 causes preform 100 to expand and be molded into a predetermined shape conforming to the mold cavity. To achieve a desired final shape, fluid pressure typically needs to be selected that is sufficiently high to urge the preform into all portions of the mold cavity. Upon completion of the molding process, seal portion 52 can return to the extended and seated position to thereby seal fluid injector 62 and prevent further flow of the liquid from the nozzle.

Figure 3:
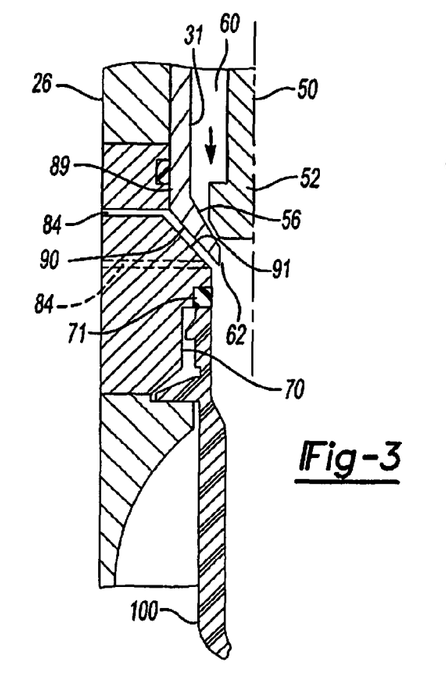
FIG. 3 is a partial, cross-sectional view illustrating a venting system according to some embodiments of the present teachings having a moveable valve system for selectively opening and closing the venting system.
Figure 4:
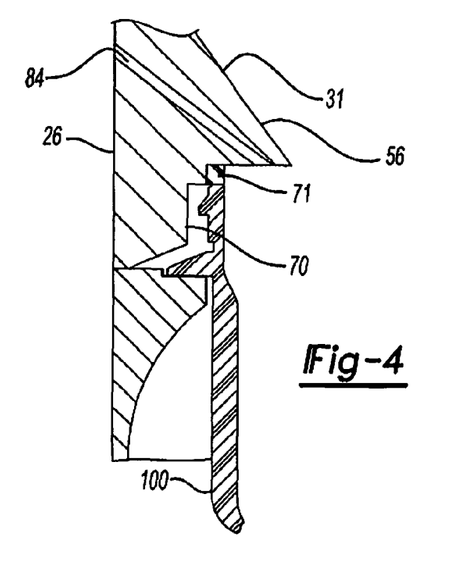
FIG. 4 is a partial, cross-sectional view illustrating an off-center venting system according to some embodiments of the present teachings.

In some embodiments, as illustrated in FIG. 1, housing 26 can comprise a ring depression 70 formed along a bottom side of housing 26 to sealingly receive preform 100 along the threaded region, the lower sealing ridge, and/or the support ring. In some embodiments, as illustrated in FIGS. 3, 4, and 8, a seal member 71 can be disposed between preform 100 and ring depression 70, such as along a top surface thereof, to sealingly engage nozzle system 22 against preform 100 to provide a fluid seal therebetween.

Moreover, in some embodiments, one or more seal members are used to enhance the sealing connection between nozzle system 22 and preform 100. More particularly, in some embodiments, one or more seal members are used to create a more robust, overall sealing interface between nozzle system 22 and preform 100. These additional seal members, described herein, can be used in addition to seal member 71 and/or in place thereof. The sealing arrangement between the nozzle system 22 and preform 100 not only fluidly seals the top of the preform 100 during forming and filling stage, but also serves to seal the top and/or bottom of the neck supporting ring 102 (FIG. 8), thereby preventing or at least minimizing liquid seepage into the mold and/or along the exterior of the preform 100 prior to forming and filling. Use of the present sealing technique further permits the use of higher forming pressures. It should be appreciated that the seals of the present teachings, including seals 71, 73, 75, and 78, can be made of any sealing material that provide resilient and reliable sealing engagement between the respective members. Therefore, it should also be appreciated that a seal used for sealing between metallic members may differ from a seal used for sealing between a metallic member and a PET preform or container. Generally, seals of the present teachings can be O-rings, gaskets, and the like, and can be made of any resilient material, such as rubber, silicone, elastomer, and the like known in the art.

Figure 8:
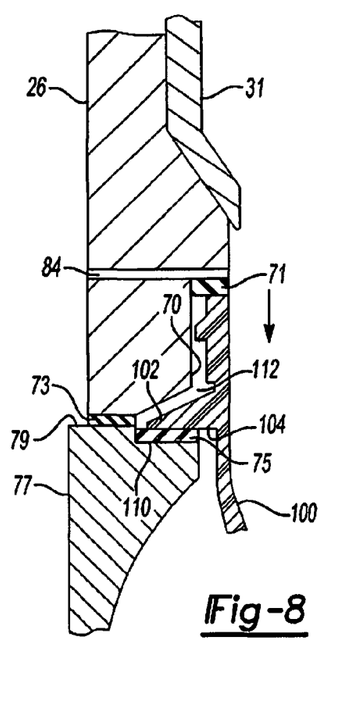
FIG. 8 is a partial, cross-sectional view illustrating a single off-center venting system according to some embodiments of the present teachings.
Figures 10, 11:
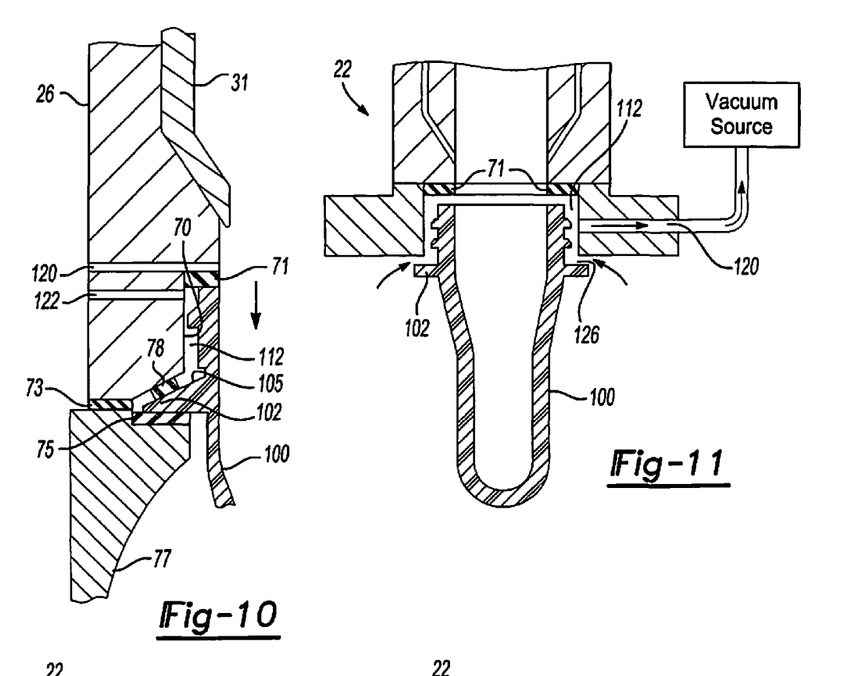
FIG. 10 is a partial, cross-sectional view illustrating a venting system according to some embodiments of the present teachings.
FIG. 11 is a partial, cross-sectional view illustrating an aspiration system according to some embodiments of the present teachings.

As illustrated in FIGS. 8 and 10, in some embodiments, nozzle system 22 and/or mold device 10 can comprise a nozzle-to-mold seal 73, a support ring-to-mold seal 75, and/or a nozzle-to-support ring seal 78. It should be appreciated that although seal 71, seal 73, seal 75, and seal 78 are described in some embodiments herein as being separate members from their adjacent or adjoining major components, it should be appreciated that the discussion herein should not be regarded as limiting seals 71, 73, 75, and 78 to include only separate members. That is, in some embodiments, seals 71, 73, 75, and 78 can each include a sealing engagement by virtue of contact of the associated major members. For instance, seal 73 can be a sealing engagement of the contact surfaces of nozzle system 22 and mold device 77, such as via a metal-to-metal contact surface. Likewise, seal 75 can be a sealing engagement of the contact surfaces of support ring 102 and mold device 77, such as via a metal-to-plastic contact surface. Therefore, it is important to recognize that the principles of the present teachings should not be regarded as being limited to include a separate physical member at these sealing interfaces. The present teachings can be equally useful, in some embodiments, using a contact face between adjoining members without the need for a separate member. With that said, the discussion herein will focus on the use of a separate member, but the claims are not to be regarded as being limited to a separate member unless specifically noted.

Nozzle-to-mold seal 73 can comprise a sealing member disposed between a lower surface of housing 26 of nozzle system 22 and a top surface 79 of a mold device 77. In this way, during actuation and engagement of nozzle system 22 and mold device 77, a fluidic seal is formed by virtue of the mechanical engagement of nozzle system 22, nozzle-to-mold seal 73, and mold device 77.

Likewise, support ring-to-mold seal 75 can act as a sealing member and be disposed between a top surface 110, which may be different than top surface 79, of mold device 77 and a bottom portion 104 of support ring 102. In this way, during actuation and engagement of nozzle system 22 and mold device 77, a fluidic seal is formed by virtue of preform 100 mechanically engaging support ring-to-mold seal 75 and mold device 77.

Still further, nozzle-to-support ring seal 78 can act as a sealing member and be disposed between lower surface of housing 26 of nozzle system 22 and a top portion 105 of support ring 102 (FIG. 10). In this way, during actuation and engagement of nozzle system 22 and mold device 77, a fluidic seal is formed by virtue of nozzle system 22, nozzle-to-support ring 78 and preform 100.

In some embodiments, pressurized air can be introduced into the volume 112 between seal member 71 and/or nozzle-to-support ring seal 78, nozzle-to-mold seal 73, and/or support ring-to-mold seal 75 to further enhance the quality of the sealing interface and provide a counter pressure to the exterior of the container finish thus preventing unwanted deformation that may result from filling or forming pressure. This counter pressure is preferably generally equal to the internal pressure created within the preform during container filling and forming. This counter pressure will be in the range from about 10 bar to about 60 bar, but preferably at about 40 bar for most processes. In some embodiments, seal member 71, nozzle-to-mold seal 73, support ring-to-mold seal 75, and/or nozzle-to-support ring seal 78 can be made of any sealing material, such as silicone, rubber, or the like.

It should be appreciated that the manufacturing techniques of the present teachings provide the ability to employ increased formation fluid pressures compared to those commonly using in conventional two-step blow molding. In fact, use of the aforementioned seals enables increased formation pressures, reduce product wastage, increased production run time (due to reduced need for cleaning and/or decontamination), and improved container quality.

It should be noted, however, that in some applications and with some liquids, some overflow of liquid commodity L can occur. That is, as should be appreciated from the foregoing, at the end of the forming cycle, nozzle system 22 is disengaged from preform 100 (or the finally formed and filled container). Typically, the liquid commodity within the container can be under at least some pressure and as such the engagement of nozzle system 22 can result in an expulsion of liquid commodity from the filled container. Therefore, according to additional principles of the present teachings, controlled decompression, pressure equalization, and/or application of a slight vacuum (e.g. about 50 mbar) of the liquid is anticipated.

Various splash mitigation or burp reduction techniques can be used to control or manage this liquid expulsion. It is believed that this expulsion results from any one of a number of factors, such as the heating of the air inside of the preform, wherein the air is expanding with the heat transfer from the liquid being injected and the resultant thermal expansion of the air within the preform pushes the liquid out of the container. In some situations, the forming pressure within the preform is not completely removed from the system at the point in time that the nozzle assembly is lifted from the container. Still further, in some situations when performing a $CO_2$ fill cycle, the $CO_2$ can come out of solution due to product agitation or sudden decompression and results in increased pressure. Finally, in some situations, container shrinkage resulting from residual container stresses following forming and filling at higher temperatures and cause a reduced container volume and increased pressure. However, in each of the aforementioned situations, it has been found that they can be more readily controlled through the use of a vent system.

Figure 5:
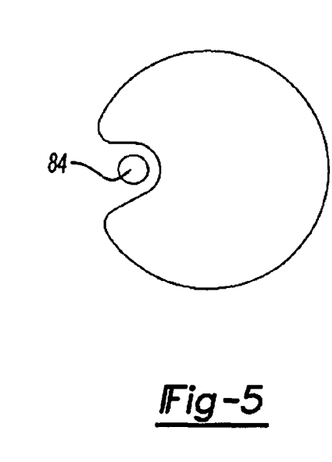
FIG. 5 is a top schematic view illustrating an off-center venting system.
Figure 6:
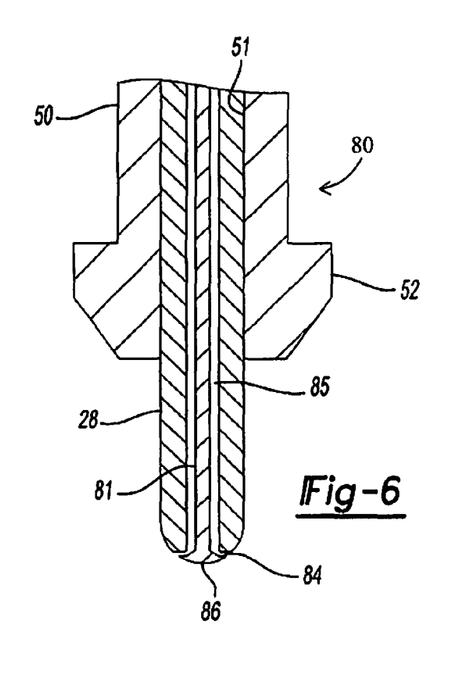
FIG. 6 is a partial, cross-sectional view illustrating a seal pin having a venting system disposed within a stretch rod according to some embodiments of the present teachings.
Figure 7:
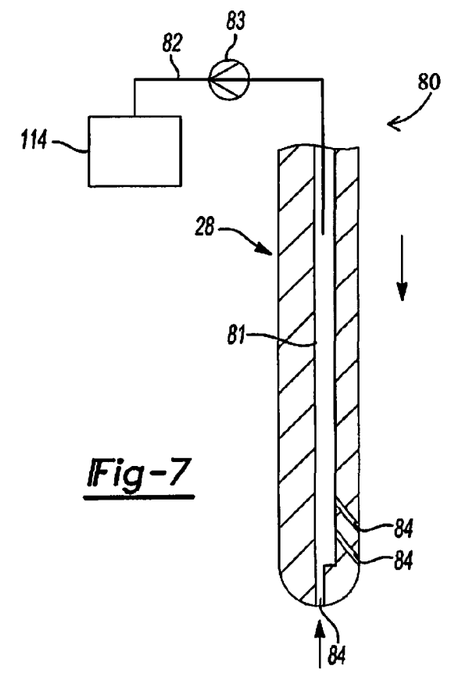
FIG. 7 is a partial, cross-sectional view illustrating a stretch rod having a plurality of vents according to some embodiments of the present teachings.

With particular reference to FIG. 3-9, a plurality of vent systems are illustrated for use in connection with the principles of the present teachings. In some embodiments, a vent system 80 can be used to vent or otherwise decompress the internal pressure of preform 100 (or the resultant filled container) prior to or in conjunction with the removal of nozzle system 22 therefrom. In some embodiments, the stretch rod 28 can enable venting through a central vent bore 81 of stretch rod 28. Vent bore 81 can be fluidly coupled to a storage tank 114, a drain, or reintroduced into the system (assuming such reintroduction is appropriate) via a vent line 82. In some embodiments, a valve 83 can be disposed within vent line 82 to monitor and/or control the venting process. Valve 83 can be a fast-acting valve that controls the pressure release through simple opening and closing, or controlled opening and sequencing to slowly control the pressure loss through programmed movements of the valve. As illustrated in FIG. 7, vent bore 81 can be fluidly coupled the interior volume of preform 100 (or the resultant filled container) via one or more ports or vents 84. It should be recognized that the number of ports 84 used and their associated location may vary depending upon the particular application. In some embodiments, ports 84 can be disposed at distal tip 32 of stretch rod 28 and/or disposed at an angle relative to the central axis of stretch rod 28.

In some embodiments as seen in FIGS. 10-11, one or more vent ports 120, 122 can be placed above and/or below seal 71 to aspirate residual liquid from volume 112 via a vacuum source. It is understood that multiple ports may be combined both above seal surface 71 to provide venting of residual air from preform prior to or during container formation and also below the seal surface 71 to provide for aspiration of residual forming liquid from the container finish area during and after container formation. Such an aspirator system, such as illustrated in FIG. 11, may comprise a single vacuum port 120 with entry point located below seal surface 71. Vacuum port 120 will be connected to a vacuum source to create a negative pressure within the void between the container finish and nozzle system 22 during the time the seal is maintained. At the time nozzle system 22 is raised away from seal surface 71 air flow will be facilitated through vacuum port 120, at a circumferential gap 126, thereby enabling removal of residual liquid from around the outside of the container finish area.

Figures 12, 13:
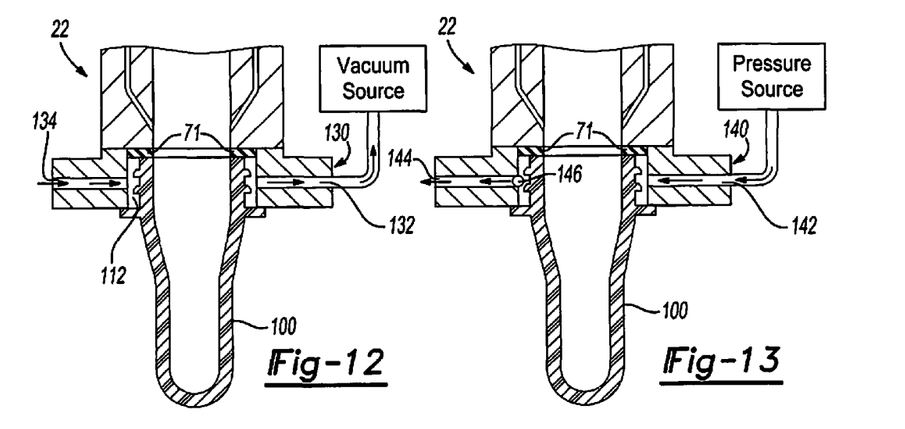
FIG. 12 is a partial, cross-sectional view illustrating an aspiration system according to some embodiments of the present teachings.
FIG. 13 is a partial, cross-sectional view illustrating an aspiration system according to some embodiments of the present teachings.

In another embodiment seen in FIG. 12, aspirator system may comprise multiple ports 130 each having entry points below seal surface 71. The multiple ports 130 will include at least one vacuum port 132 and at least one air flow control channel 134 to enable a continuous flow of air around the exterior of the container finish while the nozzle system 22 is in a down position and sealably engaged to seal surface 71. In this embodiment, air flow control channel 134 allows air to enter the nozzle system 22 while air is exiting through vacuum port 132 as the vacuum source provides means for air flow thus allowing continuous removal of unwanted liquid from the exterior finish area 112 even as a seal is maintained between nozzle system 22 and seal surface 71.

In still another embodiment seen in FIG. 13, aspirator system may comprise multiple ports 140 each having entry points below seal surface 71. The multiple ports will include at least one pressure port 142 and at least one air flow control channel 144 to enable a counter pressure to be applied to the exterior of the finish during container formation and subsequent removal of excess liquid from the exterior finish area through the air flow control channel 144. In this embodiment, air flow control channel 144 will include a pressure control valve 146, such as a check valve, that allows for selective movement between an open and closed position. This valve will be in a closed position during container forming. During or prior to forming, a pressurized fluid, such as air, is introduced through pressure port 142. The pressurized air will serve to create a counter pressure to the finish exterior to counter any forces applied to the finish interior during the filling and forming process thereby preventing unwanted finish deformation. This counter pressure will be in the range from about 10 bar to about 60 bar, but preferably at about 40 bar for most processes. After the forming stage, pressure control valve 146 is opened allowing pressurized air to freely exit through the air flow control channel 144 resulting in removal of unwanted liquid from the exterior finish area 112 even as a seal is maintained between nozzle system 22 and seal surface 71.

In some embodiments as illustrated in FIG. 6, venting can be accomplished using a stretch rod seal pin 85 having a stretch rod seal pin tip 86 disposed on a distal end thereof. Stretch rod seal pin 85 is slidably disposed within a bore 87 centrally extending along stretch rod 28. Tip 86 is positionable between an opened position, spaced apart from the end of stretch rod 28, and a closed position, in sealing engagement with the end of stretch rod 28. In operation, stretch rod seal pin 85 can be actuated between the opened and closed position to selectively permit venting of the interior volume of preform 100. By locating the stretch rod seal pin 85 at a distal end of stretch rod 28, control of liquid commodity L is more positive and, thus, droplets of the liquid can be more easily avoided. That is, by locating the controlling element proximal the exit of stretch rod 28, residual liquid within the bore is avoided and drips are minimized. This can serve to minimize contamination and the need for additional cleaning cycles.

The movement of stretch rod seal pin 85 can be achieved using an air cylinder, motor, or other means of creating a mechanical movement, such as sliding and/or rotating. This would allow precise relief of pressure and timing from the fill head. It could be used to vent air trapped in the preform at the beginning of the fill. A vacuum could be applied to the stretch rod or valve to assist in pressure removal and to remove small amount of liquid from the stretch rod tip to prevent dripping into the preform.

Figure 9:
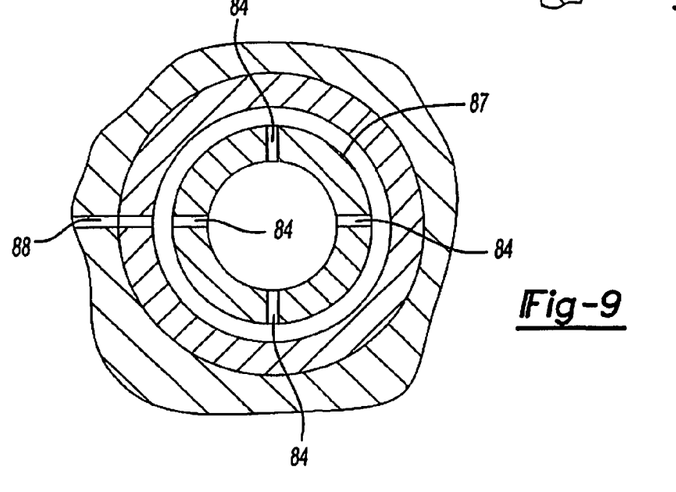
FIG. 9 is a top schematic view illustrating a plurality of vents being fluidly coupled to a collection ring and main relief line according to some embodiments of the present teachings.

In some embodiments, as illustrated in FIGS. 3, 4, 8, and 9, venting can be achieved via one or more ports or vents 84 disposed in housing 26 or nozzle assembly 22. More particularly, one or more vents 84 extending through at least a portion of nozzle assembly 22 can be disposed generally adjacent to the opening or finish area of preform 100. In some embodiments, as illustrated in FIG. 9, these vents 84 can be radially disposed (FIG. 9) and fluidly coupled to a collection ring 87 that if fluidly coupled to a main relief 88. In some embodiments, an off center venting arrangement can be used, as illustrated in FIG. 5.

In some embodiments, as illustrated in FIG. 3, vents 84 that extend through at least a portion of nozzle assembly 22 can be mechanically opened and closed using an inner nozzle member 89 that is slidably disposed within enlarged intermediate portion 31 of bore 30. In this way, inner nozzle member 89 can be linearly or rotationally actuated via a control device, such as a motor, piston, or the like, and moved between a raised and opened position (FIG. 3) and a lowered and closed position. In the lowered and closed position, inner nozzle member 89 is translated downwardly (in FIG. 3) such that a surface 90 of inner nozzle member 89 abuts a surface 91 of housing 26 (or nozzle assembly 22) to collapse and thus close vent 84. In some embodiments, a distal end 92 of inner nozzle member 89 can further extend down to sufficient close additional vents 84 (shown hidden in FIG. 3).

During operation, variations of the venting process can be used as is appropriate. That is, in some embodiments, nozzle system 22 can move down to engage the finish of preform 100, such that the seal 71 contacts and sealingly engages preform 100. Inner nozzle member 89 can continue to move downward to seal vents 84. Liquid commodity L can then be injected to form and fill preform 100 into a resultant filled container. Retraction of inner nozzle member 89 can be performed to vent the pressure within the result filled container prior to disconnection of seal 71 from the container. The process can then be finalized by retracting nozzle system 22 from the formed and filled container without spillage or contamination.

Alternatively, prior to closing of vents 84, liquid commodity L can be injected into preform 100 to permit air and/or liquid within preform 100 to escape via the opened vents 84. In this way, once a sufficient amount of air and/or liquid is vented via vents 84, vents 84 can be closed to complete the forming and filling process. Additionally, in some embodiments, stretch rod 28 can be extended within preform 100 prior to injection of liquid commodity L to aid in displacing air within preform 100 prior to or simultaneously with injection of liquid commodity L. Still further, in some embodiments, vents 84 can be used to draw a vacuum (such as through the use of a venture system and/or pump system) on preform 100 after closure of nozzle assembly 22 and prior to injection of liquid commodity L. Each of these solutions serves to eliminate or at least minimize the potential for expulsion of liquid following the forming and filling cycle by providing a method to evacuate at least a portion of fluid within preform 100 prior to nozzle assembly 22 retraction. It should be recognized that vents 84 can be opened at any time prior to injecting liquid commodity L, at least partially simultaneous to injecting liquid commodity L, and/or after injecting of liquid commodity L.

Finally, in some embodiments, it should be recognized that an inert gas introduction system can be used to inject inert gas, such as nitrogen or carbon dioxide, via vents 84 proximate to distal end of stretch rod 28 to displace air within the preform. The displaced air is allowed to escape via open vents 84 in the nozzle assembly 22. This allows for removal of oxygen and other harmful gases from the preform while adding inert or potentially helpful gasses to the preform prior to filling with liquid.

It should also be recognized that in some embodiments, the vents can also be cleaned via filling cleaning methods including CIP. The venting can also assist in the CIP cleaning process by allowing liquid flow closer to the bottom of the blow nozzle.

Alternately, other manufacturing methods using other conventional materials including, for example, thermoplastic, high density polyethylene, polypropylene, polyethylene naphthalate (PEN), a PET/PEN blend or copolymer, and various multilayer structures may be suitable for the manufacture of the plastic container. Those having ordinary skill in the art will readily know and understand plastic container manufacturing method alternatives.

According to some embodiments, the teachings of the present disclosure provide a system for forming a container from a preform, wherein the preform has a finish and a support ring. The system comprises a mold having a mold cavity defining an internal surface and adapted to accept the preform; a pressure system having an inlet and an outlet, the pressure system outputting fluid; a blow nozzle receiving the fluid from the pressure system and introducing the fluid at a pressure into the preform thereby expanding the preform toward the internal surface of the mold cavity and creating a resultant container; a first seal engagement selectively engageable between the blow nozzle and the finish of the preform; and a second seal engagement selectively engageable between the blow nozzle and an adjacent feature.

In some embodiments, the adjacent feature comprises a top surface of the support ring of the preform such that the second seal engagement is disposable between the blow nozzle and the top surface of the support ring of the preform. In some embodiments, the adjacent feature comprises the mold such that the second seal engagement is disposed between the blow nozzle and the mold.

In some embodiments, the system can comprise a third seal engagement disposable between a bottom surface of the support ring and the mold. In some embodiments, the third seal engagement comprises a fluidic seal generally inhibiting flow of the fluid between the bottom surface of the support ring and the mold in response to mechanical engagement the bottom surface of the support ring and the mold.

In some embodiments, the first seal engagement comprises a fluidic seal generally inhibiting flow of the fluid between the blow nozzle and the top of the finish of the preform in response to mechanical engagement of the blow nozzle with the top of the finish of the preform.

In some embodiments, the second seal engagement comprises a fluidic seal generally inhibiting flow of the fluid between the blow nozzle and the adjacent feature in response to mechanical engagement of the blow nozzle with the adjacent feature.

In some embodiments, the system can comprise venting means for venting air within the preform before, during, or after the introduction of the fluid into the preform, the venting means being positioned upstream of the first seal engagement along a fluid path extending from the pressure system to the preform.

In some embodiments, the system can comprise venting means for venting air within the preform before, during, or after the introduction of the fluid into the preform, the venting means being positioned between the first seal engagement and the second seal engagement along the fluid path.

In some embodiments, the system can comprise a stretch rod system having a stretch rod slidably movable between an extended position and a retracted position, the stretch rod operable to engage and selectively stretch the preform before or during the introduction of the fluid; and venting means for venting air within the preform before, during, or after the introduction of the fluid into the preform, the venting means being positioned within the stretch rod. In some embodiments, the venting means disposed within the stretch rod comprises a central bore extending within the stretch rod.

In some embodiments, the system can comprise venting means for venting air within the preform before, during, or after the introduction of the fluid into the preform; and inert gas introduction means for introducing inert gas into the preform to displace air, the displaced air being vented via the venting means. In some embodiments, the system can comprise a stretch rod system having a stretch rod slidably movable between an extended position and a retracted position, the stretch rod operable to engage and selectively stretch the preform before or during the introduction of the fluid, the stretch rod having a central bore, wherein the displaced air is vented via the central bore.

In some embodiments, the system can comprise a counter pressure system operably coupled between the first seal engagement and the second seal engagement, the counter pressure system applying a counter pressure generally equal to a pressure within the preform during the introduction of the fluid. In some embodiments, the counter pressure is in the range of about 10 bar to about 60 bar. In some embodiments, the counter pressure is about 40 bar.

In some embodiments, the system can comprise a valve system operably coupled to the counter pressure system, the valve system being closed during the introduction of the fluid into the preform, the valve system being opened after the introduction of the fluid into the preform to remove residual liquid from a volume between the first seal engagement and the second seal engagement.

In some embodiments, the system can comprise an aspiration port system operably coupled between the first seal engagement and the second seal engagement, the aspiration port system applying a vacuum sufficient to remove residual liquid from a volume between the first seal engagement and the second seal engagement. In some embodiments, the aspiration port system comprises only a single port coupled between the first seal engagement and the second seal engagement. In some embodiments, the aspiration port system applies a vacuum sufficient to remove residual liquid from the volume only after the blow nozzle is retracted from the finish of the preform thereby selectively disengaging the first seal engagement. In some embodiments, the aspiration port system applies a vacuum sufficient to remove residual liquid or air from the volume while the first seal engagement and the second seal engagement are selectively engaged. In some embodiments, the aspiration port system comprises a plurality of ports coupled between the first seal engagement and the second seal engagement. In some embodiments, the plurality of ports comprises at least one inlet port and at least one outlet port.

According to some embodiments, the teachings of the present disclosure provide a system for forming a container from a preform, wherein the preform has a finish and a support ring. The system includes a mold having a mold cavity defining an internal surface and adapted to accept the preform; a pressure system having an inlet and an outlet, the pressure system outputting fluid; a blow nozzle receiving the fluid from the pressure system defining a fluid path into the preform and introducing the fluid at a pressure into the preform thereby expanding the preform toward the internal surface of the mold cavity and creating a resultant container; and a venting means for venting air within the preform before, during, or after the introduction of the fluid into the preform.

In some embodiments, the system can comprise a first seal engagement engageable between the blow nozzle and the finish of the preform, wherein the venting means is disposed upstream of the first seal engagement along the fluid path.

In some embodiments, the system can comprise a second seal engagement engageable between the blow nozzle and an adjacent feature, wherein the venting means is disposed between the first seal engagement and the second seal engagement along the fluid path.

In some embodiments, the adjacent feature comprises a top surface of the support ring of the preform such that the second seal engagement is disposable between the blow nozzle and the top surface of the support ring of the preform.

In some embodiments, the adjacent feature comprises the mold such that the second seal engagement is disposed between the blow nozzle and the mold.

In some embodiments, the adjacent feature comprises a stretch rod system having a stretch rod slidably movable between an extended position and a retracted position, the stretch rod operable to engage and selectively stretch the preform before or during the introduction of the fluid, wherein the venting means is disposed within the stretch rod. In some embodiments, the venting means disposed within the stretch rod comprises a central bore extending within the stretch rod.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system for forming a container from a preform, the preform having a finish and a support ring, the system comprising:
    a mold having a mold cavity defining an internal surface and adapted to accept the preform;
    a pressure system having an inlet and an outlet, the pressure system outputting liquid;
    a blow nozzle receiving the liquid from the pressure system and introducing the liquid at a pressure into the preform thereby expanding the preform toward the internal surface of the mold cavity and creating a resultant container;
    a first seal engagement selectively engageable between the blow nozzle and the finish of the preform; and
    a second seal engagement selectively engageable between the blow nozzle and an adjacent feature;
    wherein the first seal engagement and the second seal engagement are arranged to prevent liquid seepage along the exterior of the preform prior to forming and filling the preform.

2. The system of claim 1 wherein the adjacent feature comprises a top surface of the support ring of the preform such that the second seal engagement is disposable between the blow nozzle and the top surface of the support ring of the preform.

3. The system of claim 1 wherein the adjacent feature comprises the mold such that the second seal engagement is disposed between the blow nozzle and the mold.

4. The system of claim 3, further comprising:
    a third seal engagement disposable between a bottom surface of the support ring and the mold.

5. The system of claim 4 wherein the third seal engagement comprises a fluidic seal generally inhibiting flow of the liquid between the bottom surface of the support ring and the mold in response to mechanical engagement of the bottom surface of the support ring and the mold.

6. The system of claim 1 wherein the first seal engagement comprises a fluidic seal generally inhibiting flow of the liquid between the blow nozzle and the top of the finish of the preform in response to mechanical engagement of the blow nozzle with the top of the finish of the preform.

7. The system of claim 1 wherein the second seal engagement comprises a fluidic seal generally inhibiting flow of the liquid between the blow nozzle and the adjacent feature in response to mechanical engagement of the blow nozzle with the adjacent feature.

8. The system of claim 1, further comprising:
    venting means for venting air within the preform before, during, or after the introduction of the liquid into the preform, the venting means being positioned upstream of the first seal engagement along a fluid path extending from the pressure system to the preform.

9. The system of claim 1, further comprising:
    venting means for venting air within the preform before, during, or after the introduction of the liquid into the preform, the venting means being positioned between the first seal engagement and the second seal engagement along the fluid path.

10. The system of claim 1, further comprising:
    a stretch rod system having a stretch rod slidably movable between an extended position and a retracted position, the stretch rod operable to engage and selectively stretch the preform before or during the introduction of the liquid; and
    venting means for venting air within the preform before, during, or after the introduction of the liquid into the preform, the venting means being positioned within the stretch rod.

11. The system of claim 10 wherein the venting means disposed within the stretch rod comprises a central bore extending within the stretch rod.

12. The system of claim 1, further comprising:
    venting means for venting air within the preform before, during, or after the introduction of the liquid into the preform; and
    inert gas introduction means for introducing inert gas into the preform to displace air, the displaced air being vented via the venting means.

13. The system of claim 12, further comprising:
    a stretch rod system having a stretch rod slidably movable between an extended position and a retracted position, the stretch rod operable to engage and selectively stretch the preform before or during the introduction of the liquid, the stretch rod having a central bore, wherein the displaced air is vented via the central bore.

14. A system for forming a container from a preform, the preform having a finish and a support ring, the system comprising:
- a mold having a mold cavity defining an internal surface and adapted to accept the preform;
- a pressure system having an inlet and an outlet, the pressure system outputting fluid;
- a blow nozzle receiving the fluid from the pressure system and introducing the fluid at a pressure into the preform thereby expanding the preform toward the internal surface of the mold cavity and creating a resultant container;
- a first seal engagement selectively engageable between the blow nozzle and the finish of the preform;
- a second seal engagement selectively engageable between the blow nozzle and an adjacent feature; and
- a counter pressure system operably coupled between the first seal engagement and the second seal engagement, the counter pressure system applying a counter pressure generally equal to a pressure within the preform during the introduction of the fluid.

15. The system of claim 14 wherein the counter pressure is in the range of about 10 bar to about 60 bar.

16. The system of claim 15 wherein the counter pressure is about 40 bar.

17. The system of claim 14, further comprising:
- a valve system operably coupled to the counter pressure system, the valve system being closed during the introduction of the fluid into the preform, the valve system being opened after the introduction of the fluid into the preform to remove residual liquid from a volume between the first seal engagement and the second seal engagement.

18. A system for forming a container from a preform, the preform having a finish and a support ring, the system comprising:
- a mold having a mold cavity defining an internal surface and adapted to accept the preform;
- a pressure system having an inlet and an outlet, the pressure system outputting fluid;
- a blow nozzle receiving the fluid from the pressure system and introducing the fluid at a pressure into the preform thereby expanding the preform toward the internal surface of the mold cavity and creating a resultant container;
- a first seal engagement selectively engageable between the blow nozzle and the finish of the preform;
- a second seal engagement selectively engageable between the blow nozzle and an adjacent feature; and
- an aspiration port system operably coupled between the first seal engagement and the second seal engagement, the aspiration port system applying a vacuum sufficient to remove residual liquid from a volume between the first seal engagement and the second seal engagement.

19. The system of claim 18 wherein the aspiration port system comprises only a single port coupled between the first seal engagement and the second seal engagement.

20. The system of claim 18 wherein the aspiration port system applies a vacuum sufficient to remove residual liquid from the volume only after the blow nozzle is retracted from the finish of the preform thereby selectively disengaging the first seal engagement.

21. The system of claim 18 wherein the aspiration port system applies a vacuum sufficient to remove residual liquid or air from the volume while the first seal engagement and the second seal engagement are selectively engaged.

22. The system of claim 21 wherein the aspiration port system comprises a plurality of ports coupled between the first seal engagement and the second seal engagement.

23. The system of claim 22 wherein the plurality of ports comprises at least one inlet port and at least one outlet port.

24. The system of claim 14, further comprising:
- a venting means for venting air within the preform before, during, or after the introduction of the fluid into the preform.

25. The system of claim 24
wherein the venting means is disposed upstream of the first seal engagement along the fluid path.

26. The system of claim 24
wherein the venting means is disposed between the first seal engagement and the second seal engagement along the fluid path.

27. The system of claim 26 wherein the adjacent feature comprises a top surface of the support ring of the preform such that the second seal engagement is disposable between the blow nozzle and the top surface of the support ring of the preform.

28. The system of claim 26 wherein the adjacent feature comprises the mold such that the second seal engagement is disposed between the blow nozzle and the mold.

29. The system of claim 24, further comprising:
- a stretch rod system having a stretch rod slidably movable between an extended position and a retracted position, the stretch rod operable to engage and selectively stretch the preform before or during the introduction of the fluid, wherein the venting means is disposed within the stretch rod.

30. The system of claim 29 wherein the venting means disposed within the stretch rod comprises a central bore extending within the stretch rod.

31. A system for forming a container from a preform, the preform having a finish and a support ring, the system comprising:
- a mold having a mold cavity defining an internal surface and adapted to accept the preform;
- a pressure system having an inlet and an outlet, the pressure system outputting liquid;
- a blow nozzle receiving the liquid from the pressure system and introducing the liquid at a pressure into the preform thereby expanding the preform toward the internal surface of the mold cavity and creating a resultant container;
- a first seal engagement selectively engageable between the blow nozzle and the finish of the preform; and
- a second seal engagement selectively engageable between the blow nozzle and an adjacent feature;
- wherein the first seal engagement and the second seal engagement are arranged to inhibit flow of the liquid between the nozzle and the adjacent feature.

* * * * *